US008823911B2

(12) United States Patent
Nagano

(10) Patent No.: US 8,823,911 B2
(45) Date of Patent: Sep. 2, 2014

(54) LIQUID CRYSTAL DISPLAY DEVICE

(75) Inventor: Shingo Nagano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 550 days.

(21) Appl. No.: 12/980,796

(22) Filed: Dec. 29, 2010

(65) Prior Publication Data
US 2011/0181824 A1 Jul. 28, 2011

(30) Foreign Application Priority Data

Jan. 28, 2010 (JP) .................................. 2010-016795

(51) Int. Cl.
*G02F 1/1343* (2006.01)

(52) U.S. Cl.
CPC .................... *G02F 1/134363* (2013.01); *G02F 2001/134372* (2013.01)
USPC ........................................................ 349/143

(58) Field of Classification Search
None
See application file for complete search history.

(56) References Cited

U.S. PATENT DOCUMENTS

| 6,744,482 | B2 * | 6/2004 | Matsumoto et al. .......... 349/141 |
| 6,982,776 | B2 | 1/2006 | Nagano et al. |
| 7,855,772 | B2 * | 12/2010 | Wang et al. .................... 349/143 |
| 2001/0010576 | A1 * | 8/2001 | Lee et al. ....................... 349/141 |
| 2008/0186440 | A1 * | 8/2008 | Lim et al. ...................... 349/141 |
| 2009/0195723 | A1 | 8/2009 | Araki et al. |
| 2010/0066952 | A1 * | 3/2010 | Tsuchiya et al. .............. 349/106 |
| 2010/0171892 | A1 | 7/2010 | Lim et al. |

FOREIGN PATENT DOCUMENTS

| JP | 11-202356 | 7/1999 |
| JP | 2002-221736 | 8/2002 |
| JP | 2005-525595 | 8/2005 |
| JP | 2008-191669 | 8/2008 |
| JP | 2008-197343 | 8/2008 |
| JP | 2010-2674 | 1/2010 |
| WO | WO 03/096112 A1 | 11/2003 |

OTHER PUBLICATIONS

Office Action issued Mar. 4, 2014, in Japanese Patent Application No. 2010-016795 with English translation of relevant part.
Office Action issued in Japanese Patent Application No. 2010-016795 on Dec. 10, 2013 with partial English translation.

* cited by examiner

*Primary Examiner* — Michelle R Connelly
(74) *Attorney, Agent, or Firm* — Oblon, Spivak, McClelland, Maier & Neustadt, L.L.P.

(57) ABSTRACT

A pixel of a liquid crystal display device includes a scan line, a signal line, a TFT, a lower electrode, and an upper electrode arranged thereon with a protection film interposed therebetween, in which the upper electrode includes a plurality of branch electrode parts electrically connected in common, and a gap part between the branch electrode parts. The upper electrode includes a region in which a ratio of a width of the gap part to a width of the branch electrode part that is adjacent to the gap part is different, and includes both of a region in which a light transmittance increases and a region in which the light transmittance decreases with respect to a change in the ratio.

20 Claims, 11 Drawing Sheets

LIQUID CRYSTAL DISPLAY DEVICE

INCORPORATION BY REFERENCE

This application is based upon and claims the benefit of priority from Japanese patent application No. 2010-016795, filed on Jan. 28, 2010, the disclosure of which is incorporated herein in its entirety by reference.

BACKGROUND OF THE INVENTION

1. Field of the Invention

The present invention relates to a liquid crystal display device. More specifically, the present invention relates to an electrode shape of a fringe field switching (FFS) type liquid crystal display device.

2. Description of Related Art

In recent years, in substitution for a conventional cathode-ray tube, new display devices having a thin flat-type display panel using principles of liquid crystals, electroluminescence or the like have been used a lot. A liquid crystal display device which represents these new display devices has characteristics in that it can be driven with a low power voltage, in addition to its thinness and lightness. The liquid crystal display device includes a liquid crystal layer disposed between two substrates. One substrate is an array substrate forming a display area in which a plurality of pixels are arranged in matrix, and the other substrate is a color filter substrate.

In particular, in a thin film transistor (TFT)-type liquid crystal display device, a TFT which is a switching element is provided in each pixel on the array substrate, and each pixel is able to independently carry a voltage to drive a liquid crystal layer, thereby making it possible to achieve the display of high quality with less crosstalk. Each pixel includes a scan line (gate line) that controls ON/OFF of the TFT, and a signal line (source line) for inputting image data. Each pixel typically corresponds to an area surrounded by the scan line and the signal line.

An In-Plane switching (IPS)-type liquid crystal display device has one array substrate on which a plurality of pixel electrodes and opposed electrodes (common electrodes) are alternately arranged, so as to apply a substantially-horizontal electric field to the substrate surface for display. The IPS type liquid crystal display device has better view angle property compared with a typical TN (Twisted Nematic) type. However, the conventional IPS-type liquid crystal display device has a smaller light transmittance compared with the typical TN type.

As a system in which this defect is improved, a fringe field switching (FFS) system has been suggested (for example, Japanese Unexamined Patent Application Publication Nos. 11-202356, 2008-197343). The FFS-type liquid crystal display device is the system of achieving the display by applying a fringe electric field (an oblique electric field including both components of a horizontal electric field and a vertical electric field) to a liquid crystal layer. In the FFS-type liquid crystal display device, the pixel electrode and the opposed electrode are formed on one array substrate as is similar to the IPS system. However, the pixel electrode and the opposed electrode are overlapped with each other with an insulation film interposed therebetween. Typically, the lower electrode has a plate-like shape (the lower electrode may be a plurality of brunch-like electrodes). Furthermore the upper electrode includes a plurality of branch electrode parts electrically connected in common, and gap parts each of which being interposed between the branch electrode parts.

The pixel electrode may be formed either in the lower electrode or the upper electrode. In the transmission type, the pixel electrode and the opposed electrode are both formed of transparent conductive films. In the reflective type, the upper electrode may be formed of a transparent conductive film and the lower electrode may be formed of a conductive film having high reflectance rate. The liquid crystal layer is driven by the fringe electric field between the upper electrode and the lower electrode in the FFS system, thereby making it possible to drive the liquid crystal layer on the branch electrode parts and gap parts of the upper electrode. For example, in the transmission type, the pixel electrode and the opposed electrode are formed of transparent conductive films. Thus, the FFS system achieves improved light transmittance than the IPS system that transmits little light on the pixel electrode and the opposed electrode.

SUMMARY OF THE INVENTION

However, the present inventors have found a problem as follows. In the conventional FFS system, the widths of the gap parts and the branch electrode parts of the upper electrode relate to an electric field applied to a liquid crystal layer, and give an influence on the light transmittance of a pixel. Accordingly, the problem is that, when there are produced variations in dimension of the width of the gap parts or the branch electrode parts of the upper electrode in an exposing process or an etching process or the like in an array manufacturing process, the variations may be recognized as display unevenness of the liquid crystal display device.

The present invention has been made in order to overcome the problem as above, and in particular, aims to provide an FFS-type liquid crystal display device with fewer display unevenness due to variations in dimension of the width of the gap parts or the branch electrode parts of the upper electrode.

A first exemplary aspect of the present invention is a liquid crystal display device including: a pair of substrates; a liquid crystal layer that is sealed between the substrates; and a display area including a plurality of pixels arranged therein in matrix on one of the substrates, the pixels being defined by scan lines and signal lines that cross with the scan lines, in which each of the pixels includes a switching element, a lower electrode, and an upper electrode that is arranged on the lower electrode with an insulation film interposed therebetween, the upper electrode includes a plurality of branch electrode parts electrically connected in common, and a gap part between the branch electrode parts, the upper electrode includes a region in which a ratio of a width of the gap part to a width of the branch electrode part that is adjacent to the gap part is different, and the upper electrode includes both of a region in which a light transmittance increases and a region in which the light transmittance decreases with respect to a change in the ratio.

An FFS-type liquid crystal display device according to the present invention makes it possible to reduce display unevenness due to variations in dimension of the width of the gap parts or the branch electrode parts of the upper electrode.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Hereinafter, exemplary embodiments of a display device of the present invention will be described in detail with reference to the drawings. Throughout the drawings, the same or similar parts are denoted by the same reference symbols, and overlapping description will be omitted as appropriate.

First Exemplary Embodiment

Figure 1:
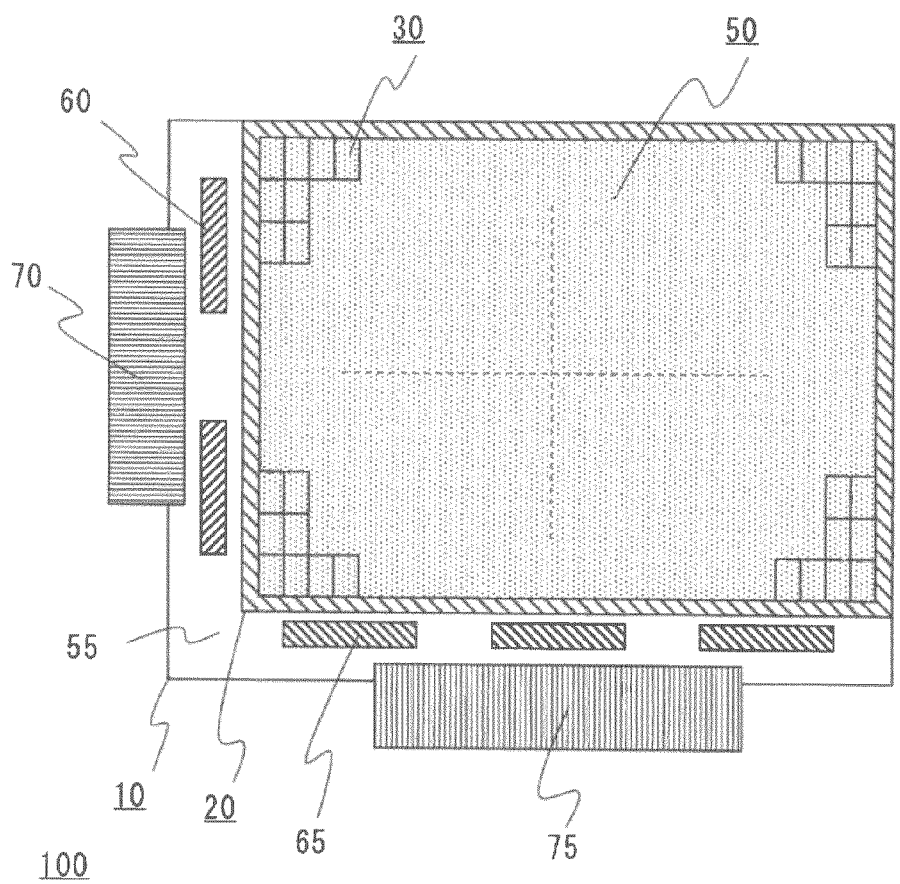
FIG. 1 is a plane view schematically showing a liquid crystal display device according to a first exemplary embodiment.

First, a configuration of a liquid crystal display device will be described in brief. FIG. 1 is a plane view schematically showing a liquid crystal display device according to a first exemplary embodiment.

In a display area 50 of a liquid crystal display device 100, a plurality of pixels 30 are arranged in matrix. The liquid crystal display device 100 includes an array substrate 10, a color filter substrate 20 and so on. The array substrate 10 includes a scan line, a signal line, a TFT, a pixel electrode and the like forming the pixel 30 formed therein. The color filter substrate 20 is arranged opposite to the array substrate 10 with a liquid crystal layer interposed therebetween, and includes a color filter, a light-shielding film (black matrix) and the like formed therein. In the FFS-type liquid crystal display device 100, an opposed electrode of a reference potential is also formed on the array substrate 10.

The array substrate 10 includes the display area 50 and a frame area 55 which is provided in the outer periphery of the display area 50 on a transparent substrate 1 such as glass or plastic. In the frame area 55, a scan line drive circuit 60 and a signal line drive circuit 65 are mounted by a COG (Chip On Glass) mounting technique. Further, in the end of the transparent substrate 1, a plurality of terminals (not shown) are arranged. In order to supply various voltages, clocks, image data or the like to the scan line drive circuit 60 and the signal line drive circuit 65, the plurality of terminals are connected to flexible substrates 70 and 75 connected to an external circuit.

In FIG. 1, there are actually provided a plurality of lines including lead-out lines of scan lines or signal lines extending from the display area 50 to the frame area 55, which are provided with the scan line drive circuit 60 or the signal line drive circuit 65, and input lines connecting between input parts of the scan line drive circuit 60 and the signal line drive circuit 65 and the plurality of terminals provided in the end of the transparent substrate 1 to connect to the flexible substrates 70 and 75. But, these lines are not shown for the sake of simplicity.

Further, since a small-sized panel has relatively a small number of lines in total, a drive circuit in which the scan line drive circuit 60 and the signal line drive circuit 65 are integrated is often used in such a small-sized panel. At the same time, the flexible substrates 70 and 75 are often used in a single plate.

Figure 2:
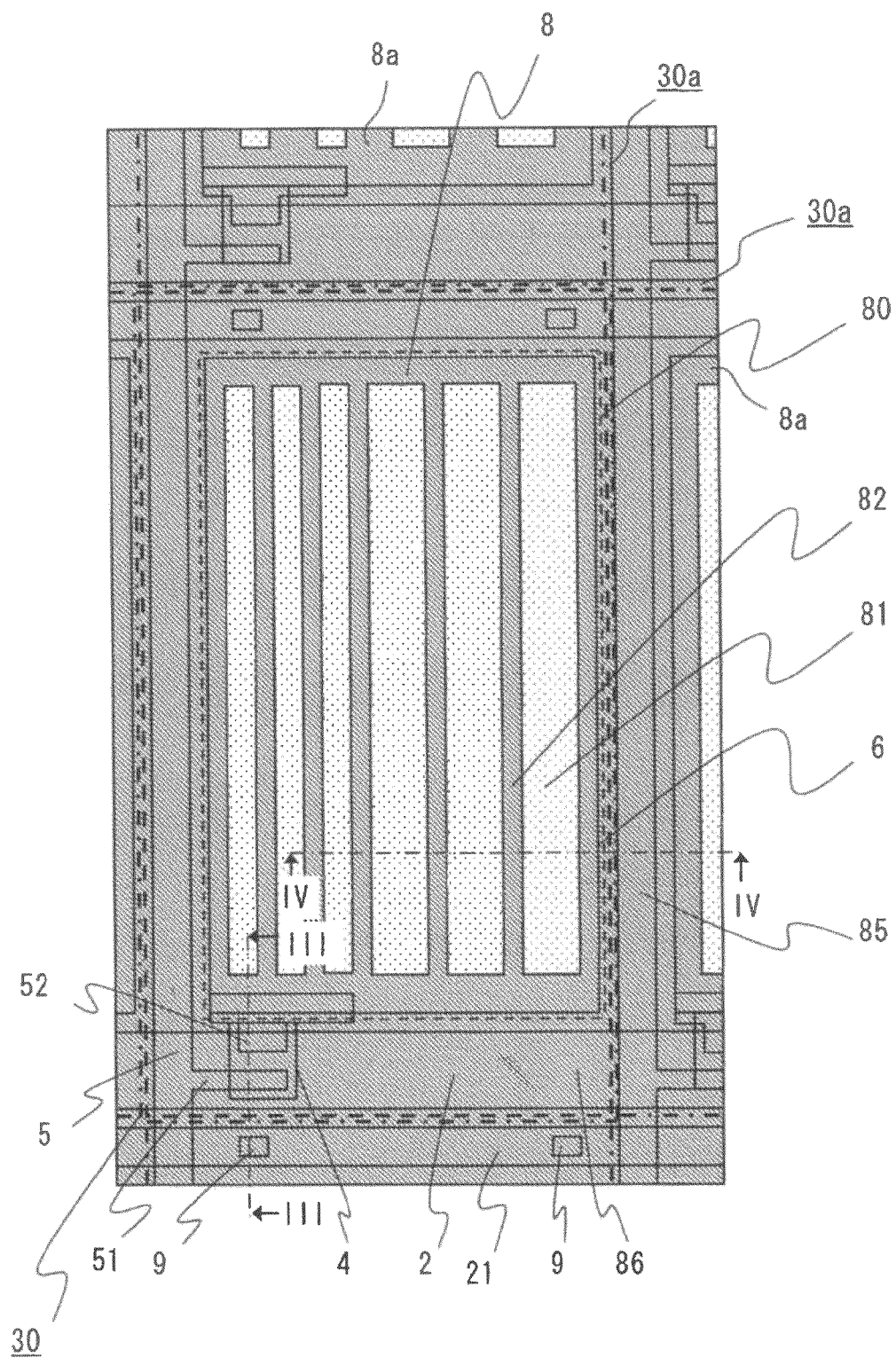
FIG. 2 is an enlarged plane view showing a pixel of a display area of the liquid crystal display device according to the first exemplary embodiment.
Figure 3:
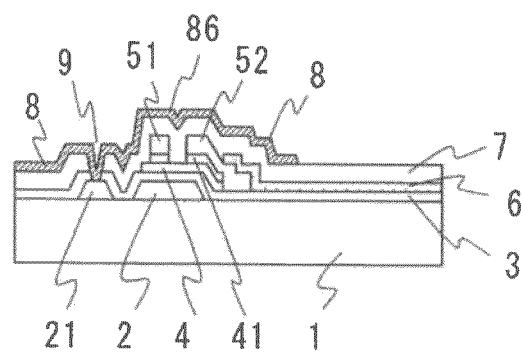
FIG. 3 is a cross-sectional view taken along the line of FIG. 2.
Figure 4:
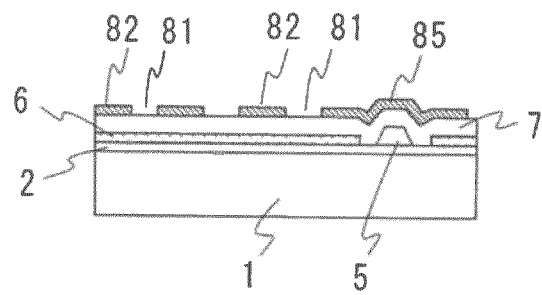
FIG. 4 is a cross-sectional view taken along the line IV-IV of FIG. 2.

FIG. 2 is an enlarged plane view showing a pixel of the display area of the liquid crystal display device according to the first exemplary embodiment. FIG. 3 is a cross-sectional view taken along the line of FIG. 2. FIG. 4 is a cross-sectional view taken along the line IV-IV of FIG. 2.

As shown in FIGS. 2, 3, and 4, on the transparent substrate 1 made of glass, plastic, or the like, scan lines 2 formed of metal (e.g., Al, Cr, Mo, Ti, Ta, W, Ni, Cu, Au, Ag), or alloy or laminated films thereof, and common lines 21 that supplies a reference potential to an opposed electrode are formed in the same layer. Then, a gate insulation film 3 made of an oxide film, a nitride film or the like is formed thereon. On a part of the gate insulation film 3 on the scan line 2, a semiconductor film 4 and an ohmic contact film 41 into which impurities are injected are laminated. Further, signal lines 5 made of metal (e.g., Al, Cr, Mo, Ti, Ta, W, Ni, Cu, Au, Ag), or alloy or laminated films thereof is formed so as to cross the scan lines 2. Further, source electrodes 51 and drain electrodes 52 are formed in the same layer as the signal lines 5 so as to overlap with the ohmic contact film 41. The ohmic contact film 41 which is located between the source electrode 51 and the drain electrode 52 is removed, and serves as a channel part. The scan line 2 which is below the channel part serves as a gate electrode, where a TFT which is a switching element is formed.

In the first exemplary embodiment, plate-like lower electrodes 6 are pixel electrodes. In the transmission type, the lower electrodes 6 are formed of a transparent conductive film such as ITO (Indium Tin Oxide) or the like. In the reflective type, the lower electrodes 6 are formed of metal such as Al, Ag, Pt, or alloy or laminated films thereof, and the surface of the lower electrodes 6 are formed of a conductive film with high reflectance rate. The lower electrode 6 is directly formed on and electrically connected to the drain electrode 51. Note that the lower electrode 6 may be formed under and electrically connected to the drain electrode 51.

On the signal line 5, the source electrode 51, the drain electrode 52, and the lower electrode 6, a protection film 7 that is formed of an insulation film such as an oxide film, a nitride film, or an organic resin film, or laminated films thereof is formed.

An upper electrode 8 which is the opposed electrode is formed on the protection film 7, which is formed on the area of the lower electrode 6 which is the pixel electrode. As shown in FIG. 2, the upper electrode 8 which is formed of a transparent conductive film such as ITO includes a plurality of gap parts 81 having no transparent conductive films, and a plurality of branch electrode parts 82 made of transparent conductive films electrically connected in common. The upper electrode 8 has a slit shape, and includes each gap part 81 between the branch electrode parts 82. The gap parts 81 do not include transparent conductive films. A fringe electric field is generated between the branch electrode parts 82 and the lower electrode 6, so as to drive the liquid crystal layer.

Although the detail will be described later, in the upper electrode 8 according to the first exemplary embodiment, the branch electrode parts 82 have a constant width, and the gap parts 81 have different widths in the direction of the scan line 2 (horizontal direction in FIG. 2).

As shown in FIGS. 2 and 3, the upper electrode 8 is connected to the common line 21 through a contact hole 9, and serves as the opposed electrode of the reference potential. The upper electrode 8 which is formed of a transparent conductive film such as ITO has larger specific resistance compared with the scan line 2 or the signal line 5 which is formed of a metal film. Thus, the upper electrode 8 is connected to the common line 21 which is formed in the same layer as the scan line 2 for each pixel 30, so as to achieve low resistance.

Furthermore, in the first exemplary embodiment, connection parts 85 and 86, which are formed integrally with the upper electrode 8 in the same layer, are formed above the direction of the signal lines 5 (vertical direction in FIG. 2) and the direction of the scan lines 2, respectively. Furthermore, the upper electrode 8 and upper electrodes 8a of adjacent pixels 30a are connected each other by the connection parts 85 and 86. The connection parts 85 and 86 cover substantially the whole part of the scan lines 2 and the signal lines 5, and are formed in a lattice (mesh) shape, so as to make the resistance of the upper electrodes 8 and 8a further lower.

Since the connection parts 85 and 86 are formed in a lattice shape, even when the common line 21 is disconnected and no reference potential is supplied from the common line 21 to the upper electrode 8, the reference potential is supplied to the upper electrode 8 from the upper electrodes 8a in the adjacent pixels 30a through the connection parts 85 and 86. Thus, it is possible to prevent a display defect and to improve the yield rate.

Further, since a leakage electric field from the scan lines 2 or the signal lines 5 to the liquid crystal layer can be shielded by covering the scan lines 2 or the signal lines 5 with the connection parts 85 and 86, a display defect due to the leakage electric field that tends to be generated near the scan lines 2 or the signal lines 5 can be suppressed. Further, in the color filter substrate 20, it is also possible to eliminate the light-shielding film along with the scan lines 2 or the signal lines 5.

Note that the connection parts 85 and 86 may be formed above either of the signal lines 5 and the scan lines 2, so as to connect between the upper electrode 8 and the upper electrodes 8a in the adjacent pixels 30a.

Figure 5:
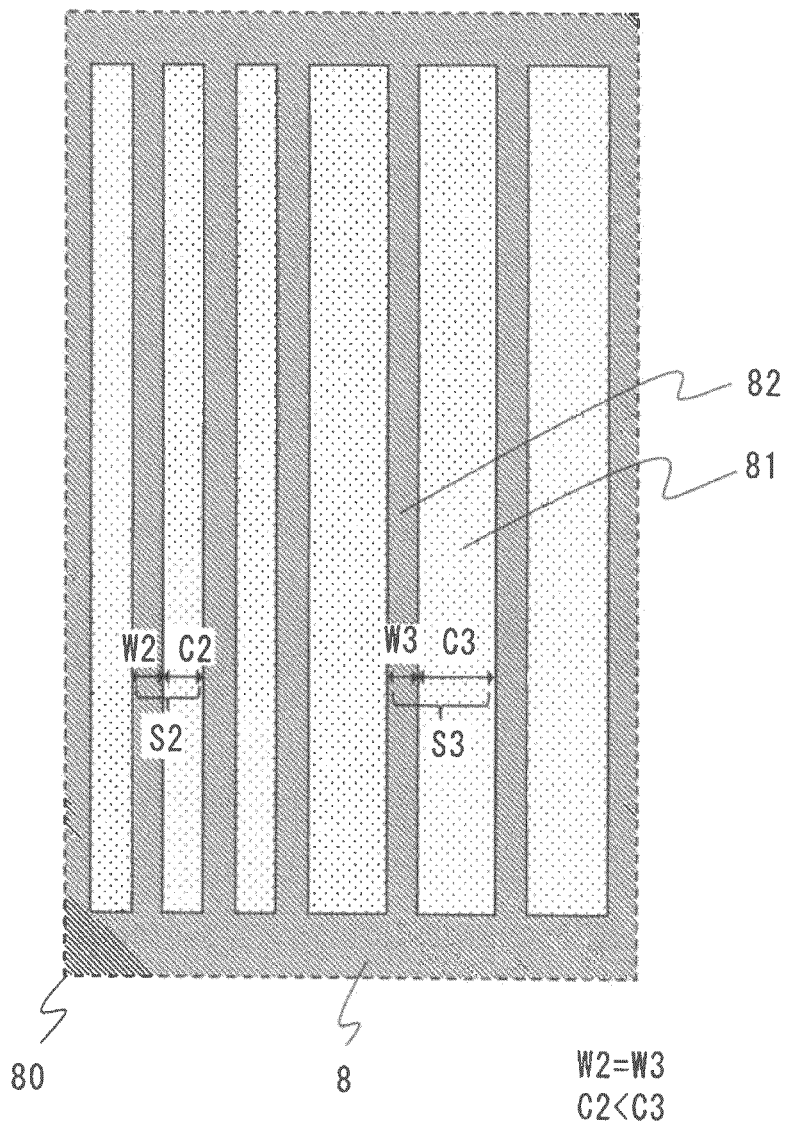
FIG. 5 is a plane view showing a main part of an upper electrode of the liquid crystal display device according to the first exemplary embodiment.

Next, the detail of the upper electrode 8 of the first exemplary embodiment will be described. FIG. 5 is a plane view showing a main part of the upper electrode of the liquid crystal display device according to the first exemplary embodiment. A main part 80 of the upper electrode 8 is the part having substantially the same size as the lower electrode 6.

The reason why the upper electrode 8 is described with the main part 80 is that, since the upper electrode 8 is connected to the upper electrodes 8a of the adjacent pixels 30a through the connection parts 85 and 86, the boundary between the upper electrode 8 and the connection parts 85 and 86 is not clear. Another reason is that it is preferable that the upper electrode 8 is described with the main part 80 also in consideration of the functional aspect that the upper electrode 8 is an electrode part that mainly contributes to the display. In the following description, the upper electrode 8 indicates the main part 80 which has basically the same size as the lower electrode 6 and serves as an electrode part which mainly contributes to the display.

As shown in FIG. 5, in the first exemplary embodiment, the upper electrode 8 includes regions S2 and S3 arranged in the direction of the scan line 2. In the regions S2 and S3, widths W2 and W3 of the branch electrode parts 82 that are provided inside with the exception for the outer peripheral part are the same (W2=W3), and widths C2 and C3 of the gap parts 81 are different. The widths of the gap parts 81 and the branch electrode parts 82 have a constant linear shape, respectively.

Note that the width of the branch electrode part 82 in the outer peripheral part of the upper electrode 8 is excluded from the constitutional condition of the present invention.

This is because, as stated above, since the connection part 85 is provided, the width of the branch electrode part 82 in the outer peripheral part of the upper electrode 8 may not be clear. Another reason is that, even when there is no connection part 85 and the upper electrode 8 does not overlap with the signal line 5, only the width of the branch electrode part 82 in the outer peripheral part of the upper electrode 8 may be made larger than the width of the inner branch electrode parts 82 in consideration of an overlay error of the light-shielding film in the color filter substrate 20 in order to prevent light leakage from a gap between the upper electrode 8 and the signal line 5.

From the above description, the first exemplary embodiment has a region S in which the ratio R (=C/W) of the width C of the gap part 81 to the width W of the branch electrode part 82, which is adjacent to the gap part 81, varies with the exception for the outer peripheral part of the upper electrode 8. Further, the constitutional condition of the present invention has the following characteristics.

The upper electrode 8 in the pixel 30 is formed so as to include both of a region S in which the light transmittance T increases and a region S in which the light transmittance T decreases with respect to the change of the ratio R. In summary, the upper electrode 8 in the pixel 30 is formed so as to cancel the increase and the decrease of the light transmittance T due to the variations in dimension of the array manufacturing process.

Figure 6:
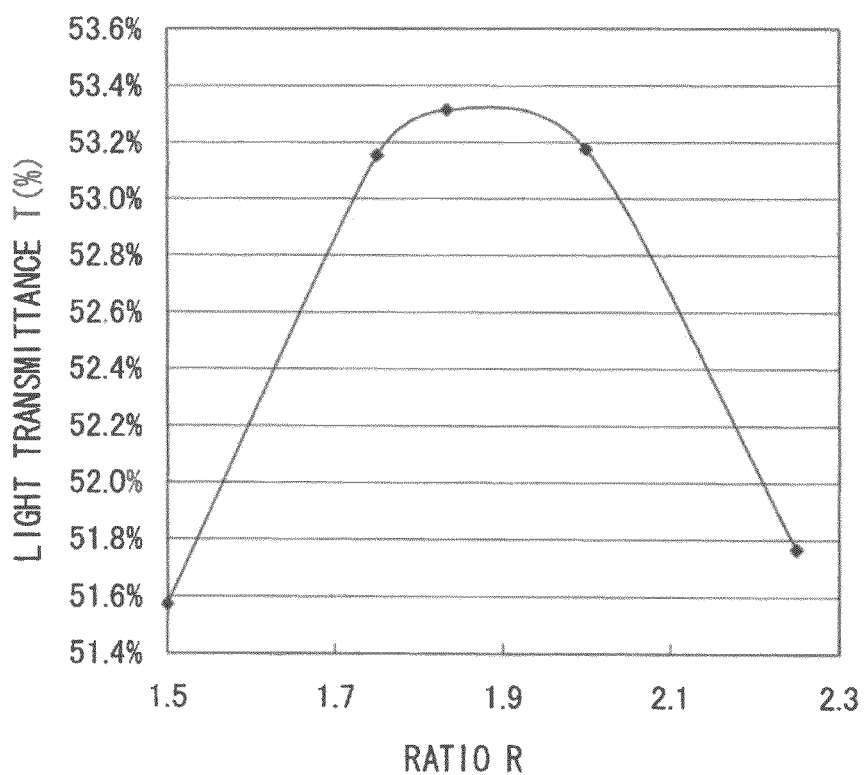
FIG. 6 is a calculation diagram showing one example of relations between light transmittances and ratios of a width of a gap part to a width of a branch electrode part that is adjacent to the gap part in the liquid crystal display device according to the first exemplary embodiment.
Figure 7:
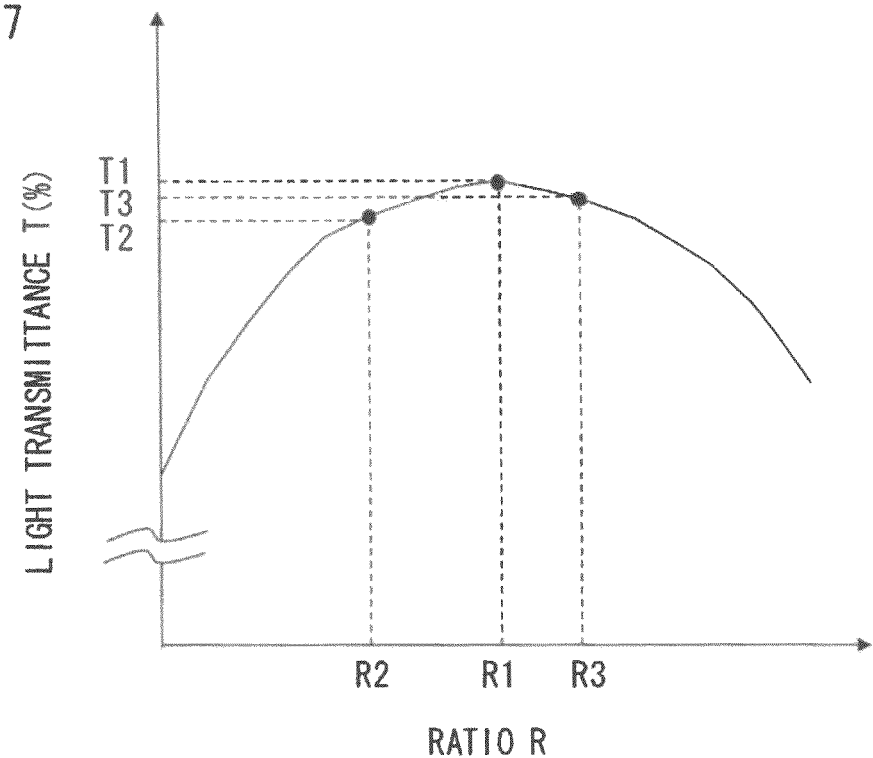
FIG. 7 is a view showing relations between light transmittances and ratios of a width of a gap part to a width of a branch electrode part that is adjacent to the gap part in the liquid crystal display device according to the first exemplary embodiment.
Figure 8:
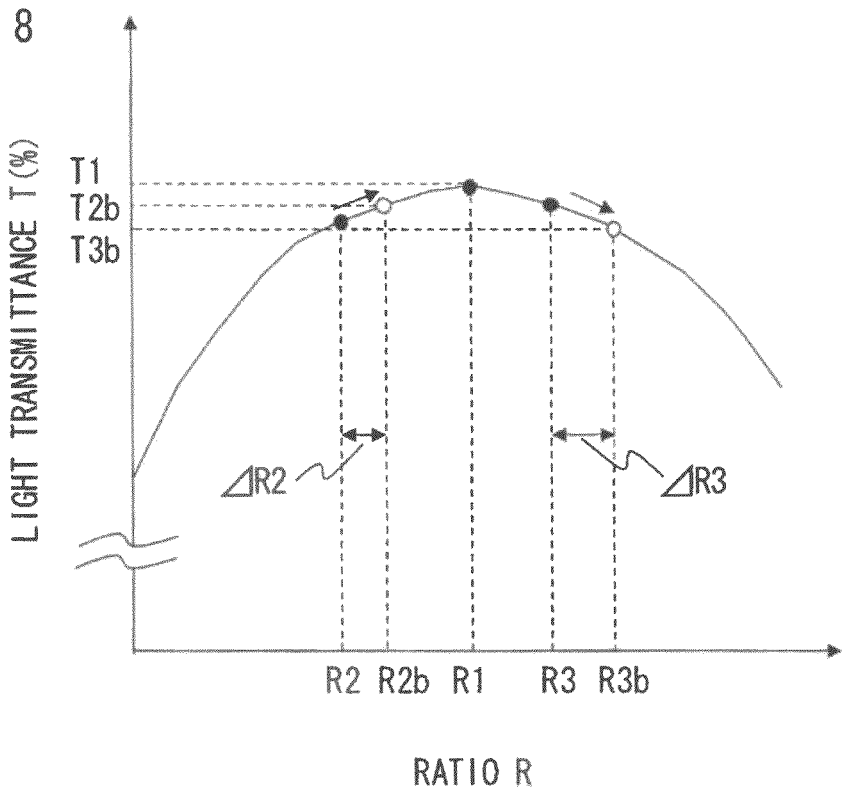
FIG. 8 is a view showing relations between light transmittances and ratios when the ratios shown in FIG. 7 vary.

Next, operations and effects of the present invention will be described in detail with reference to FIGS. 6, 7, and 8. FIG. 6 is a calculation diagram showing one example of relations between light transmittances and ratios of the width of the gap part to the width of the adjacent branch electrode part of the upper electrode of the liquid crystal display device according to the first exemplary embodiment. FIG. 7 is a view showing a relation between a light transmittance and a ratio of the width of the gap part to the width of the adjacent branch electrode part of the upper electrode of the liquid crystal display device according to the first exemplary embodiment. FIG. 8 is a view showing relations between light transmittances and ratios when the ratio shown in FIG. 7 varies.

Note that the light transmittance T is not constant even in the region S of the ratio R, but is varied according to the positions of the gap part 81 and the branch electrode part 82. Thus, the light transmittance T indicates an average value of the ratio R in the region S. The light transmittance T normalizes the maximum light transmittance as 100%.

As shown in the calculation diagram in FIG. 6, the light transmittances T in the FFS-type liquid crystal display device 100 indicate the calculation results of inversed-U shape including the ratio R1 indicating the light transmittance T1 of the maximum value with respect to the ratio R (=C/W) of the width C of the gap part 81 to the width W of the adjacent branch electrode part 82 of the upper electrode 8. In the calculation example shown in FIG. 6, the transmission rates T of the five ratios R are calculated when the width W of the branch electrode parts 82 is fixed to be 3 μm and the widths C of the adjacent gap parts 81 vary between 4.5 to 6.75 μm. In the calculation example shown in FIG. 6, calculation is performed under the voltage condition in which the light transmittances T in the intermediate gradation are about 50%, where the display unevenness is easily recognized.

The value of the ratio R1 indicating the light transmittance T1 of the maximum value also depends on the display gradation, the material of the liquid crystal layer, the thickness of the liquid crystal layer, the thickness of the protection film, the width C of the gap part 81, the width W of the branch electrode part 82 of the upper electrode 8 or the like.

In the conventional FFS-type liquid crystal display device 100, the plurality of gap parts 81 have the constant width C and the branch electrode parts 82 have the constant width W with the exception for the outer peripheral part of the upper electrode 8, and the design is generally made by one ratio R.

However, in reality, there are generated variations in dimension in the width C of the gap part 81 and the width W of the branch electrode part 82, which is adjacent to the gap part 81, in the array manufacturing processes including an exposure process and an etching process. As a result, the ratio R of the width C of the gap part 81 to the width W of the branch electrode part 82 which is adjacent to the gap part 81 varies. As shown from FIG. 7, in the case the upper electrode 8 is designed to have only one ratio R, the light transmittance T changes when the ratio R varies by dimensions variation.

Accordingly, when there are variations in dimension in the width C of the gap part 81 and the width W of the branch electrode part 82 that is adjacent to the gap part 81 in a part of the display area 50, the ratio R varies. Thus, the light transmittance T varies, and the display unevenness of the liquid crystal display device 100 can be easily recognized.

Strictly speaking, the display unevenness is determined not only by the light transmittance T but is recognized as the variation of the light transmission amount M obtained by multiplying the light transmittance T by the area of the region S of the light transmittance T.

On the other hand, in the first exemplary embodiment, as shown in FIGS. 5 and 7, while the widths W2 and W3 of the branch electrode parts 82 of the upper electrode 8 are the same (W2=W3), there are two kinds of widths C2 and C3 of the adjacent gap parts 81. Thus, the upper electrode 8 includes two kinds of regions S2 and S3 of the ratios R2 (=C2/W2) and R3 (=C3/W3). For example, in FIG. 7, the ratios R2 and R3 satisfy the expression R2<R1<R3, and the light transmittances T2, T3 of the regions S2 and S3 corresponding to the ratios R2 and R3, respectively, are somewhat smaller than the light transmittance T1 of the maximum value.

Next, with reference to FIG. 8, description will be made of a case in which the ratios R2 and R3 of the regions S2 and S3 of the upper electrode 8 are increased by ratio change amounts ΔR2 and ΔR3, respectively, to the ratios R2b and R3b in a part including the display area 50 due to the variations in dimension in the array manufacturing process. This case includes, for example, an example in which the widths C2 and C3 of the gap part 81 of the upper electrode 8 increase and the widths W2 and W3 of the branch electrode part 82 of the upper electrode 8 decrease due to overexposure, overetching or the like. Note that the ratio change amount ΔR is not necessarily the same even when constant dimensional changes are generated in the widths C2 and C3 of the gap parts 81 and the widths W2 and W3 of the branch electrode parts 82.

In FIG. 8, the region S2 of the ratio R2 satisfies the expression R2b=R2+ΔR2, which means that the light transmittance T2 is increased to the light transmittance T2b. Meanwhile, the region S3 of the ratio R3 satisfies the expression R3b=R3+ΔR3, which means that the light transmittance T3 is decreased to the light transmittance T3b. From the description above, the upper electrode 8 includes both of the region S2 where the transmission rate T increases and the region S3 where the transmission rate T decreases with respect to the change of the ratio R. The light transmission amount M of the pixel 30 is obtained by adding the result obtained by multiplying the light transmittance T2b by the area of the region S2 and the result obtained by multiplying the light transmittance T3b by the area of the region S3.

The change in the light transmission amount M of the pixel 30 is obtained by adding the result obtained by multiplying the increase of the light transmittance T (T2b−T2) by the area of the region S2 and the result obtained by multiplying the decrease of the light transmittance T (T3−T3b) by the area of the region S3. Accordingly, the increase and the decrease of the light transmission amount M cancel with each other, thereby making it possible to decrease the change of the light transmission amount M of the pixel 30, and to suppress display unevenness in the liquid crystal display device 100 due to variations in dimension of the array manufacturing process.

In particular, it is preferable to design the ratios R2 and R3, and the areas of the regions S2 and S3 so as to make the increased amount and the decreased amount of the light transmission amount M of the pixel 30 due to the variations in dimension of the array manufacturing process substantially equal to each other. Accordingly, there is little change in the light transmission amount M of the pixel 30, thereby making it possible to cancel the display unevenness of the liquid crystal display device 100 due to the variations in dimension of the array manufacturing process.

The example stated above is the case in which the ratio R increases. However, the increase and the decrease of the light transmittances T2 and T3 of the regions S2 and S3 cancel with each other also when the ratio R decreases. In this case, the increase and the decrease are reversed. Thus, in this case as well, the display unevenness of the liquid crystal display device 100 due to the variations in dimension of the array manufacturing process can be suppressed.

Second Exemplary Embodiment

Figure 9:
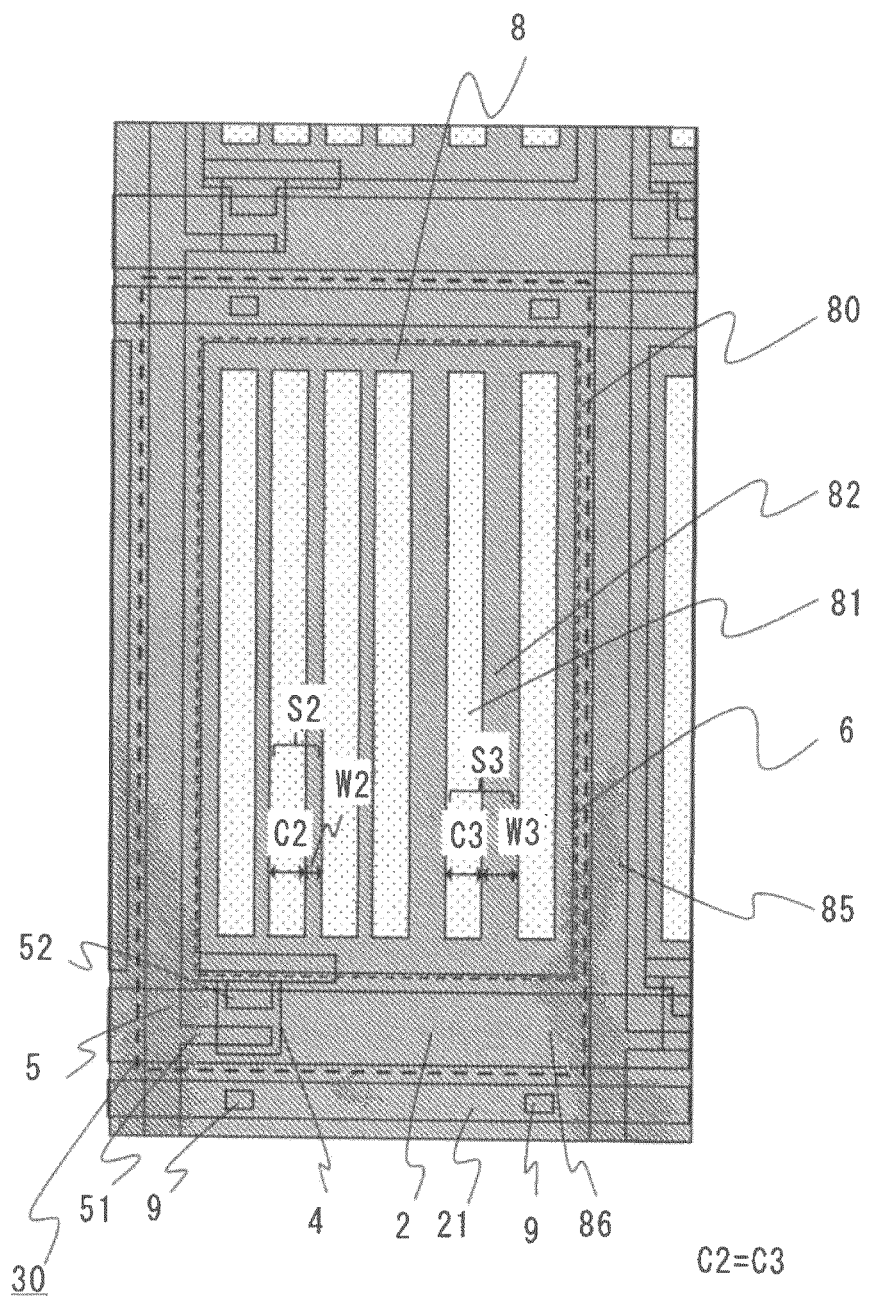
FIG. 9 is an enlarged plane view showing a pixel of a display area in a liquid crystal display device according to a second exemplary embodiment.

FIG. 9 is an enlarged plane view showing a pixel of a display area of a liquid crystal display device according to a second exemplary embodiment. Although the width W of the branch electrode parts 82 is made constant (W2=W3) in the first exemplary embodiment, in the second exemplary embodiment, the width C of the gap parts 81 of the upper electrode 8 is made constant (C2=C3), the widths W2 and W3 of the branch electrode parts 82 are made different, and two kinds of regions S2 and S3 corresponding to the ratios R2

(=C2/W2) and R3 (=C3/W3) are arranged in the direction of the scan line 2 (horizontal direction in FIG. 9).

The pixel 30 according to the second exemplary embodiment also includes, as is similar to the first exemplary embodiment, the region S in which the light transmittance T increases and the region S in which the light transmittance T decreases due to the change in the ratio R. Thus, the same advantageous effects as in the first exemplary embodiment can be obtained. In particular, it is preferable to design the ratios R2 and R3, and the areas of the regions S2 and S3 are designed so as to make the increased amount and the decreased amount of the light transmission amount M substantially equal to each other. As a result, there is little change in the light transmission amount M of the pixel 30, thereby making it possible to cancel the display unevenness of the liquid crystal display device 100 due to variations in dimension of the array manufacturing process.

Third Exemplary Embodiment

Figure 10:
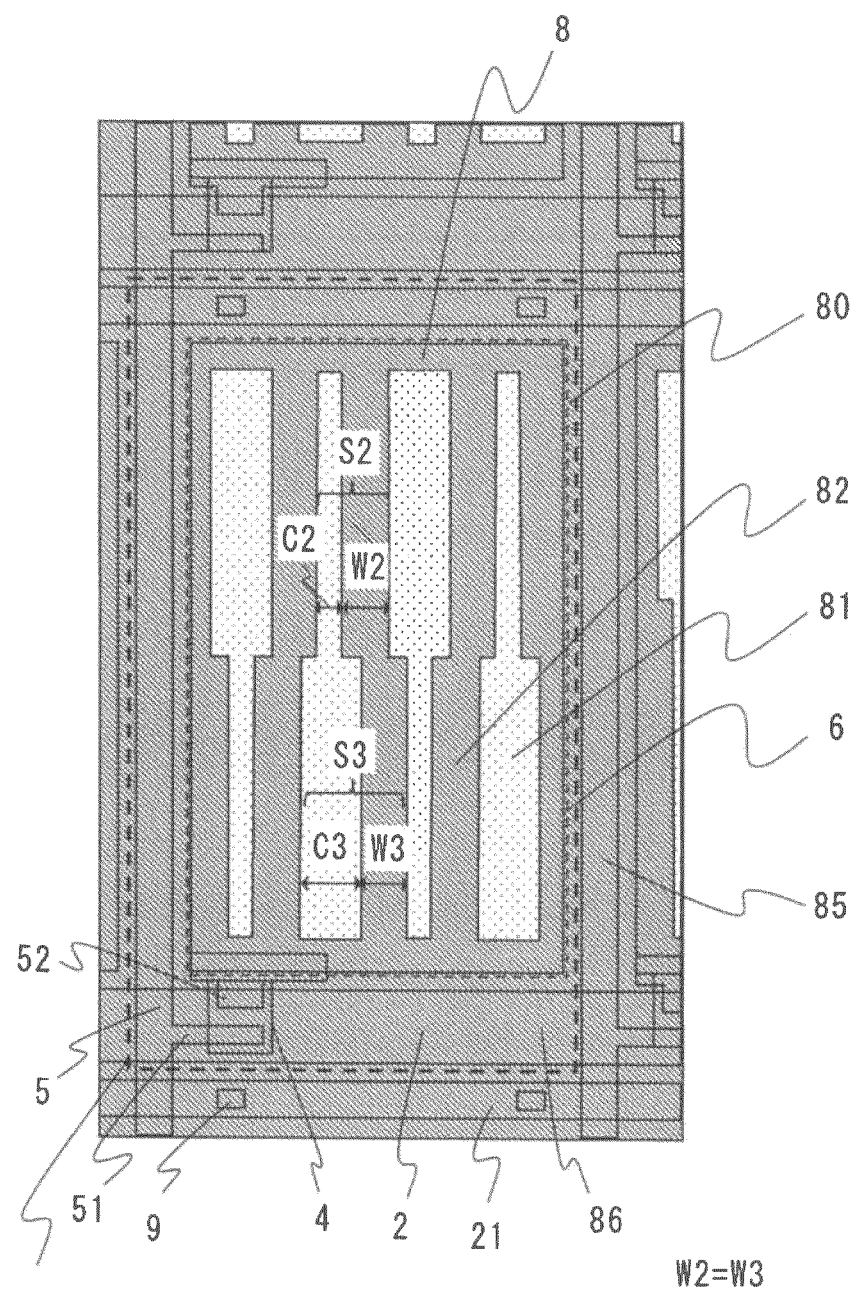
FIG. 10 is an enlarged plane view showing a pixel of a display area in a liquid crystal display device according to a third exemplary embodiment.

FIG. 10 is an enlarged plane view showing a pixel of a display area of a liquid crystal display device according to a third exemplary embodiment. In the first and the second exemplary embodiments, the width C of the gap part 81 or the width W of the branch electrode part 82 of the upper electrode 8 has a constant linear shape, respectively. However, in the third exemplary embodiment, although the widths of the branch electrode parts 82 are constant (W2=W3), one gap part 81 has different widths C2 and C3. Furthermore, the gap parts 81 are arranged to be alternately vertically symmetrical in the direction of the scan line 2 (horizontal direction in FIG. 10).

The pixel 30 according to the third exemplary embodiment also includes, as is similar to the first and the second exemplary embodiments, both of the region S in which the light transmittance T increases and the region S in which the light transmittance T decreases due to the change in the ratio R. Thus, the same advantageous effects as in the first exemplary embodiment can be obtained. In particular, it is preferable to design the ratios R2 and R3, and the areas of the regions S2 and S3 are designed so as to make the increased amount and the decreased amount of the light transmission amount M substantially equal to each other. As a result, there is little change in the light transmission amount M of the pixel 30, thereby making it possible to cancel the display unevenness of the liquid crystal display device 100 due to variations in dimension of the array manufacturing process.

Fourth Exemplary Embodiment

Figure 11:
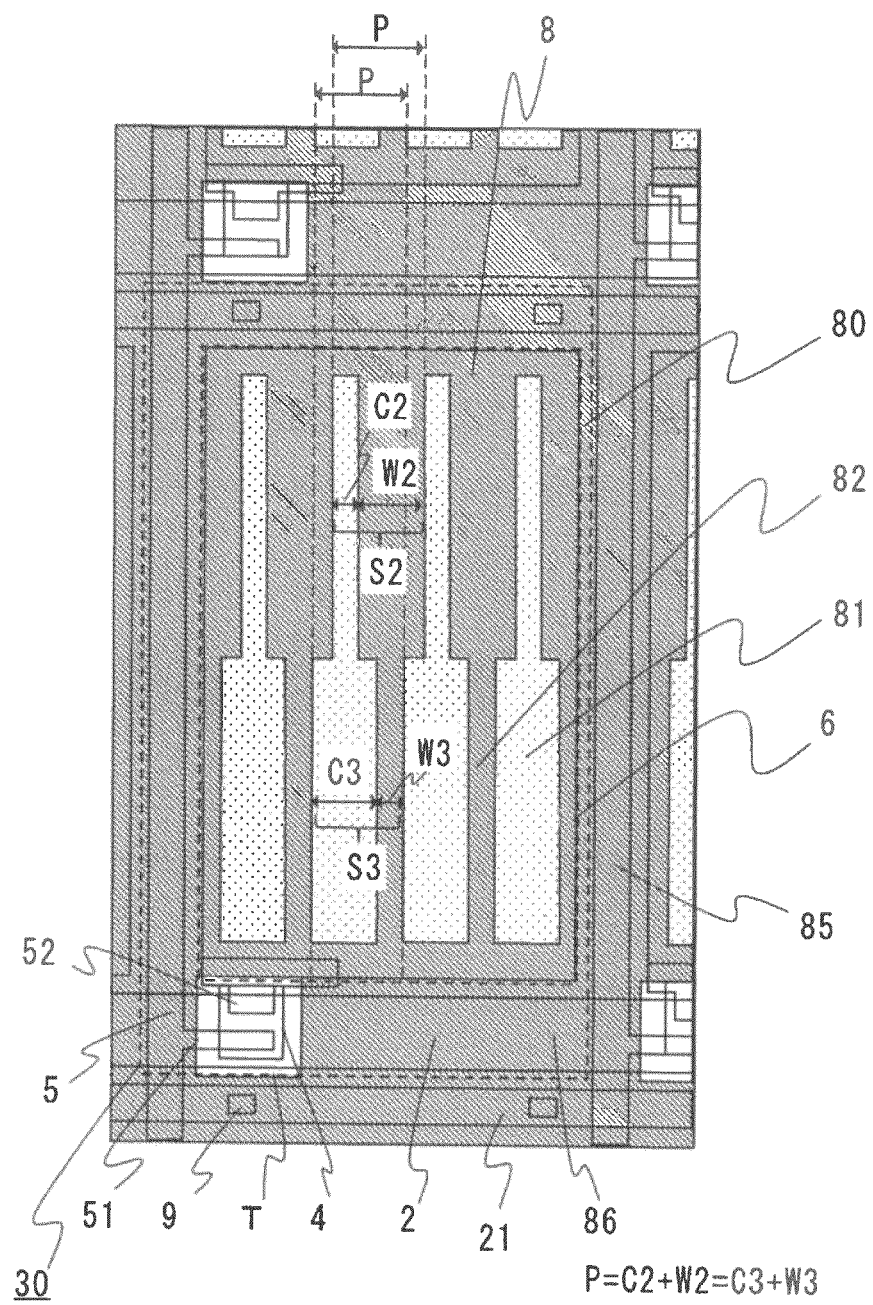
FIG. 11 is an enlarged plane view showing a pixel of a display area in a liquid crystal display device according to a fourth exemplary embodiment.

FIG. 11 is an enlarged plane view showing a pixel of a display area of a liquid crystal display device according to a fourth exemplary embodiment. While the gap parts 81 are arranged to be alternately vertically symmetrical in the direction of the scan line 2 (horizontal direction in FIG. 10) in the third exemplary embodiment, the gap parts 81 are arranged in the same shape in the direction of the scan line 2 (horizontal direction in FIG. 11) in the fourth exemplary embodiment.

Although the widths C2 and C3 of the gap part 81 and the widths W2 and W3 of the branch electrode part 82, which is adjacent to the gap part 81, are different from each other, the sum P of the widths C2 and C3 of the gap part 81 and the widths W2 and W3 of the branch electrode part 82 in each of the regions S2 and S3 is constant so as to satisfy P=C2+W2=C3+W3.

The connection parts 85 and 86 that are connected to the upper electrode 8 cover substantially the whole part of the scan line 2 and the signal line 5 in the first to third exemplary embodiments. Meanwhile, in the fourth exemplary embodiment, the connection parts 85 and 86 are formed to cover substantially the whole width of the scan line 2 and the signal line 5 with the exception for the TFT region T. Accordingly, it is possible to suppress the influence given on the ON/OFF characteristics of the TFT by the potentials of the connection parts 85 and 86 connected to the upper electrode 8.

As is similar to the first to third exemplary embodiments, the fourth exemplary embodiment also includes in the pixel 30, both of the region S in which the light transmittance T increases and the region S in which the light transmittance T decreases due to the change of the ratio R. Thus, the same advantageous effects as in the first exemplary embodiment can be obtained. In particular, it is preferable to design the ratios R2 and R3, and the areas of the regions S2 and S3 are designed so as to make the increased amount and the decreased amount of the light transmission amount M substantially equal to each other. As a result, there is little change in the light transmission amount M of the pixel 30, thereby making it possible to cancel the display unevenness of the liquid crystal display device 100 due to variations in dimension of the array manufacturing process.

Fifth Exemplary Embodiment

Figure 12:
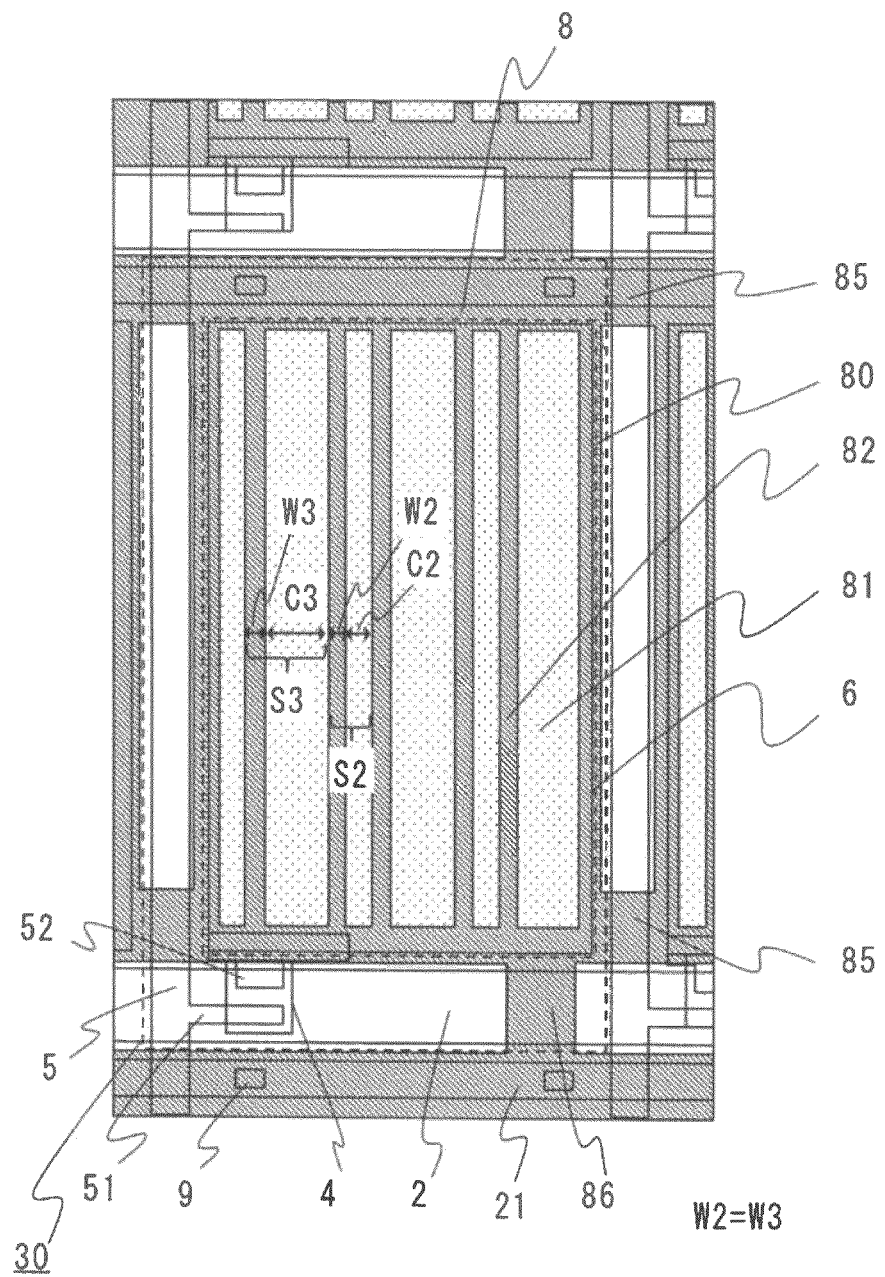
FIG. 12 is an enlarged plane view showing a pixel of a display area in a liquid crystal display device according to a fifth exemplary embodiment.

FIG. 12 is an enlarged plane view showing a pixel of a display area of a liquid crystal display device according to a fifth exemplary embodiment. In the fifth exemplary embodiment, as is similar to the first exemplary embodiment, while the widths W2 and W3 of the branch electrode parts 82 are the same (W2=W3), the widths C2 and C3 of the gap parts 81 are different. Then, the widths C2 and C3 of the gap parts 81 are alternately arranged in the direction of the scan line 2 (horizontal direction in FIG. 11). The widths of the gap part 81 and the branch electrode part 82 have constant linear shape. In short, the regions S2 and S3 of the ratios R2 (=C2/W2) and R3 (=C3/W3) is alternately arranged.

Further, in the fifth exemplary embodiment, the connection parts 85 and 86 connected to the upper electrode 8 are formed so as to cover only one part of the scan line 2 and the signal line 5. In this case, an increase in the parasitic capacitance of the scan line 2 or the signal line 5 can be suppressed although the shielding effect of the leakage electric field from the scan line 2 or the signal line 5 by the connection parts 85 and 86 decreases. Further, it is possible to suppress occurrence of the short-circuit of the connection part 85 and the signal line 5 due to the film detect of the protection film 7 or the short-circuit of the connection part 86 and the scan line 2 due to the film detects of the gate insulation film 3 and the protection film 7.

The pixel 30 according to the fifth exemplary embodiment also includes, as is similar to the first to fourth exemplary embodiments, both of the region S in which the light transmittance T increases and the region S in which the light transmittance T decreases due to the change of the ratio R. Thus, the same advantageous effects as in the first exemplary embodiment can be obtained. In particular, it is preferable to design the ratios R2 and R3, and the areas of the regions S2 and S3 are designed so as to make the increased amount and the decreased amount of the light transmission amount M substantially equal to each other. As a result, there is little change in the light transmission amount M of the pixel 30, thereby making it possible to cancel the display unevenness of the liquid crystal display device 100 due to variations in dimension of the array manufacturing process.

Sixth Exemplary Embodiment

Figure 13:
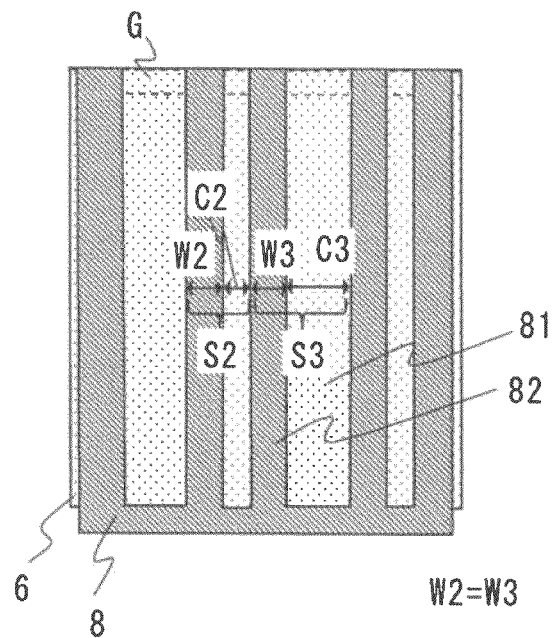
FIG. 13 is a plane view showing an upper electrode and a lower electrode of a liquid crystal display device according to a sixth exemplary embodiment.

FIG. 13 is a plane view showing an upper electrode and a lower electrode of a liquid crystal display device according to a sixth exemplary embodiment. In the sixth exemplary embodiment, the lower electrode 6 is the opposed electrode, and the upper electrode 8 is the pixel electrode. Then the shape of the upper electrode 8 is a comb-tooth shape in which at least one end of each of the gap parts 81 is opened.

In this case, the upper electrode 8 which is the pixel electrode is connected to the drain electrode (not shown), and is separated from the upper electrode of the adjacent pixel. The lower electrode 6 is connected to a common line (not shown) of a reference potential.

Further, even when the upper electrode 8 has a comb-tooth shape, the lower electrode 6 may be a pixel electrode and the upper electrode 8 may be an opposed electrode. In this case, as in the first to fifth exemplary embodiments, the upper electrode can be connected to the upper electrode 8 of the adjacent pixel through the connection part.

As is similar to the first and fifth exemplary embodiments, in the sixth exemplary embodiment, while the widths W2 and W3 of the branch electrode parts 82 are constant (W2=W3), the widths C2 and C3 of the adjacent gap parts 81 are different. The widths C2 and C3 of the gap part 81 are alternately arranged in the direction of the scan line 2 (horizontal direction in FIG. 13). Each width of the gap part 81 and the branch electrode part 82 has a constant linear shape. In summary, the regions S2 and S3 of the ratios R2 (=C2/W2) and R3 (=C3/W3) is alternately arranged.

One end of each of the gap parts 81 shown by a dotted region G is opened by changing the shape of the upper electrode 8 from a slit shape to a comb-tooth shape. Accordingly, the lower electrode 6 is exposed also in this region G and the fringe electric field can be applied more effectively, thereby increasing the light transmission amount M.

The pixel 30 according to the sixth exemplary embodiment also includes, as is similar to the first to fifth exemplary embodiments, both of the region S in which the light transmittance T increases and the region S in which the light transmittance T decreases due to the change of the ratio R. Thus, the same advantageous effects as in the first exemplary embodiment can be obtained. In particular, it is preferable to design the ratios R2 and R3, and the areas of the regions S2 and S3 are designed so as to make the increased amount and the decreased amount of the light transmission amount M substantially equal to each other. As a result, there is little change in the light transmission amount M of the pixel 30, thereby making it possible to cancel the display unevenness of the liquid crystal display device 100 due to variations in dimension of the array manufacturing process.

Seventh Exemplary Embodiment

Figure 14:
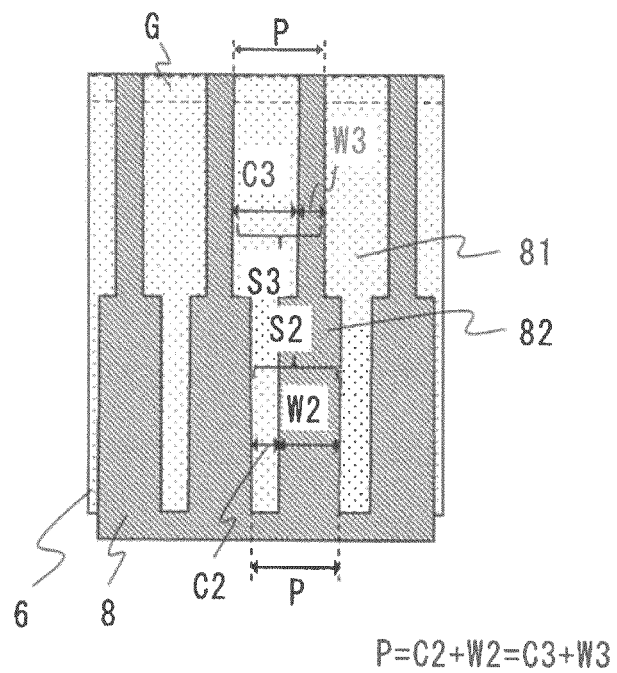
FIG. 14 is a plane view showing an upper electrode and a lower electrode of a liquid crystal display device according to a seventh exemplary embodiment.

FIG. 14 is a plane view showing an upper electrode and a lower electrode of a liquid crystal display device according to a seventh exemplary embodiment. As is similar to the sixth exemplary embodiment, the seventh exemplary embodiment includes the lower electrode 6 which is the opposed electrode and the upper electrode 8 which is the pixel electrode. Further, the upper electrode 8 has a comb-tooth shape having at least one end of each of the gap parts 81 opened.

As is similar to the fourth exemplary embodiment, the seventh exemplary embodiment has two different kinds of widths C2 and C3 in one gap part 81, and the regions S2 and S3 having the widths W2, W3 of the corresponding branch electrode part 82 are arranged in the direction of the signal line 5 (vertical direction in FIG. 14). Although the widths C2, C3 of the gap part 81 and the widths W2, W3 of the branch electrode part 82 are different from each other, the sum P of the widths C2 and C3 of the gap part 81 and the widths W2 and W3 of the branch electrode part 82 in the regions S2 and S3 is constant and expressed as P=C2+W2=C3+W3.

The pixel 30 according to the seventh exemplary embodiment also includes in, as is similar to the first to sixth exemplary embodiments, both of the region S in which the light transmittance T increases and the region S in which the light transmittance T decreases due to the change of the ratio R. Thus, the same advantageous effects as in the first exemplary embodiment can be obtained. In particular, it is preferable to design the ratios R2 and R3, and the areas of the regions S2 and S3 are designed so as to make the increased amount and the decreased amount of the light transmission amount M substantially equal to each other. As a result, there is little change in the light transmission amount M of the pixel 30, thereby making it possible to cancel the display unevenness of the liquid crystal display device 100 due to variations in dimension of the array manufacturing process.

Although the upper electrode 8 has two kinds of ratios R (=C/W) in the above exemplary embodiments, the upper electrode 8 may have three or more kinds of ratios R. For example, even when there are n kinds of regions S having different ratios R, the upper electrode 8 has both of the region S in which the light transmittance T increases and the region S in which the light transmittance T decreases with respect to the change in the ratio R. In particularly, n kinds of ratios R and the area of each region S may be designed and arranged so as to make the increased amount and the decreased amount of the light transmission amount M in the pixel 30 substantially equal to each other.

Furthermore, the branch electrode part 82 or the gap part 81 of the upper electrode 8 may have a step-like shape or a concavo-convex shape with changes of two or more widths. Alternatively, the shape may be a triangular shape or a trapezoidal shape with successive changes in widths. Further alternatively, the shape may be other shape than the straight line shape, but may be a zigzag shape or a curved shape.

Furthermore, while the gap part 81 and the branch electrode part 82 of the upper electrode 8 are arranged in the direction of the signal line 5 (vertical direction in the drawing) in the above exemplary embodiments, they may be arranged in the direction of the scan line 2 (horizontal direction in the drawing). Alternatively, they may be arranged in an oblique direction with respect to the direction of the scan line 2 (horizontal direction in the drawing) or the direction of the signal line 5 (vertical direction in the drawing).

Although the TFT has a channel etch inverted staggered structure in the exemplary embodiments described above, the TFT may be applied to a liquid crystal display device employing a TFT of etch stopper inverted staggered type or top gate type.

Although the drive circuit is mounted with the COG mounting technique in the exemplary embodiments described above, the drive circuit may be applied to a drive circuit that is mounted with the TAB (Tape Automated Bonding) mounting technique, Furthermore, the drive circuit may be had built-in by forming TFTs for the driver circuit on the array substrate.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A liquid crystal display device comprising:
a pair of substrates;
a liquid crystal layer that is sealed between the substrates; and
a display area comprising a plurality of pixels arranged therein in matrix on one of the substrates, the pixels being defined by scan lines and signal lines that cross with the scan lines, wherein
each of the pixels comprises a switching element, a lower electrode, and an upper electrode that is arranged on the lower electrode with an insulation film interposed therebetween,
the upper electrode comprises a plurality of branch electrode parts electrically connected in common, and a gap part between the branch electrode parts,
the upper electrode comprises a first region of a pixel wherein a ratio of a width of the gap part to a width of the branch electrode part that is adjacent to the gap part is a first value and a second region of said pixel wherein a ratio of a width of the gap part to a width of the branch electrode part that is adjacent to the gap part is a second value, wherein the second value is different from the first value, and
the upper electrode comprises both of a region in which a light transmittance increases, the light transmittance increasing when the ratio of the width of the gap part to the width of the branch electrode part that is adjacent to the gap increases to a first range ratio that is less than a predetermined threshold ratio, and a region in which the light transmittance decreases, the light transmittance decreasing when the ratio of the width of the gap part to the width of the branch electrode part that is adjacent to the gap increases to a second range ratio that is greater than the predetermined threshold ratio.

2. The liquid crystal display device according to claim 1, wherein an increased amount of a light transmission amount of a region in which the light transmittance increases and a decreased amount of a light transmission amount of a region in which the light transmittance decreases are substantially equal to each other, only in a vicinity of the predetermined threshold ratio.

3. The liquid crystal display device according to claim 2, wherein the upper electrode comprises a region in which the width of at least one of the gap parts or the branch electrode parts is not constant.

4. The liquid crystal display device according to claim 2, wherein the upper electrode comprises a region in which the width of at least one of the gap parts is different from the width of the other gap parts.

5. The liquid crystal display device according to claim 2, wherein the upper electrode comprises a region in which the width of at least one of the branch electrode parts is different from the width of the other branch electrode parts.

6. The liquid crystal display device according to claim 1, wherein the upper electrode comprises a region in which the width of at least one of the gap parts or the branch electrode parts is not constant.

7. The liquid crystal display device according to claim 1, wherein the upper electrode comprises a region in which the width of at least one of the gap parts is different from the width of the other gap parts.

8. The liquid crystal display device according to claim 1, wherein the upper electrode comprises a region in which the width of at least one of the branch electrode parts is different from the width of the other branch electrode parts.

9. The liquid crystal display device according to claim 1, wherein the plurality of gap parts or branch electrode parts of the upper electrode are arranged to be alternately symmetrical with respect to the vertical or horizontal direction of a pixel in a planar view.

10. The liquid crystal display device according to claim 1, wherein the upper electrode has a comb-tooth shape in which one end of each of the gap parts is opened in a planar view.

11. The liquid crystal display device according to claim 1, wherein the upper electrode is an opposed electrode which is a reference potential, and the lower electrode is a pixel electrode which is connected to a switching element.

12. The liquid crystal display device according to claim 11, wherein a connection part connected to the upper electrode is connected to the upper electrode of an adjacent pixel in the vertical or horizontal direction.

13. The liquid crystal display device according to claim 12, wherein a connection part connected to the upper electrode has a shape so as to cover substantially the whole width of the scan line or the signal line.

14. The liquid crystal display device according to claim 12, wherein the connection part connected to the upper electrode has a shape so as to cover substantially the whole width of the scan line and the signal line with the exception for a region of the switching element.

15. The liquid crystal display device according to claim 11, wherein the upper electrode is connected to a common line that is provided in the same layer as the scan line through a contact hole provided in an insulation film in each pixel.

16. The liquid crystal display device according to claim 11, wherein the lower electrode is disposed in an entire area located below the gap part.

17. The liquid crystal display device according to claim 1, wherein an instantaneous rate at which the light transmittance increases is proportional to an increase in difference between the first range ratio and the predetermined threshold ratio.

18. The liquid crystal display device according to claim 1, wherein an instantaneous rate at which the light transmittance decreases is proportional to an increase in difference between the second range ratio and the predetermined threshold ratio.

19. The liquid crystal display device according to claim 1, wherein the light transmittance reaches a maximum value at the predetermined threshold ratio.

20. The liquid crystal display device according to claim 1, wherein an instantaneous rate at which the light transmittance increases at the predetermined threshold ratio is substantially zero, and
an instantaneous rate at which the light transmittance decreases at the predetermined threshold ratio is substantially zero.

* * * * *